United States Patent [19]

Harimoto

[11] Patent Number: 5,159,852
[45] Date of Patent: Nov. 3, 1992

[54] ROLLER FOLLOWER FOR ENGINE

[75] Inventor: Kazuyoshi Harimoto, Iwata, Japan

[73] Assignee: NTN Corporation, Osaka, Japan

[21] Appl. No.: 695,136

[22] Filed: May 3, 1991

[30] Foreign Application Priority Data

Feb. 28, 1991 [JP] Japan ................................ 3-34152

[51] Int. Cl.⁵ ............................ F01L 1/18; G05G 1/00
[52] U.S. Cl. ................................... 74/559; 123/90.39
[58] Field of Search ............... 74/559, 519; 123/90.39, 123/90.44, 90.48, 90.50, 90.51; 428/621, 179, 426

[56] References Cited

U.S. PATENT DOCUMENTS

| | | | |
|---|---|---|---|
| 3,596,533 | 8/1971 | Nightingale | 74/559 |
| 4,936,270 | 6/1990 | Ushio et al. | 123/90.39 |
| 5,052,352 | 10/1991 | Taniguchi et al. | 123/90.39 |
| 5,054,440 | 10/1991 | Kadokawa | 123/90.39 X |

Primary Examiner—Vinh T. Luong
Attorney, Agent, or Firm—Nikaido, Marmelstein, Murray & Oram

[57] ABSTRACT

The present invention is directed to a roller follower for use with an engine. The roller follower incorporates a roller having a surface formed with minute recesses arranged at random so that the average value of the SK value is less than zero. Also, the ratio of the total area of the minute recesses to the entire area should be 10 to 40%.

2 Claims, 7 Drawing Sheets

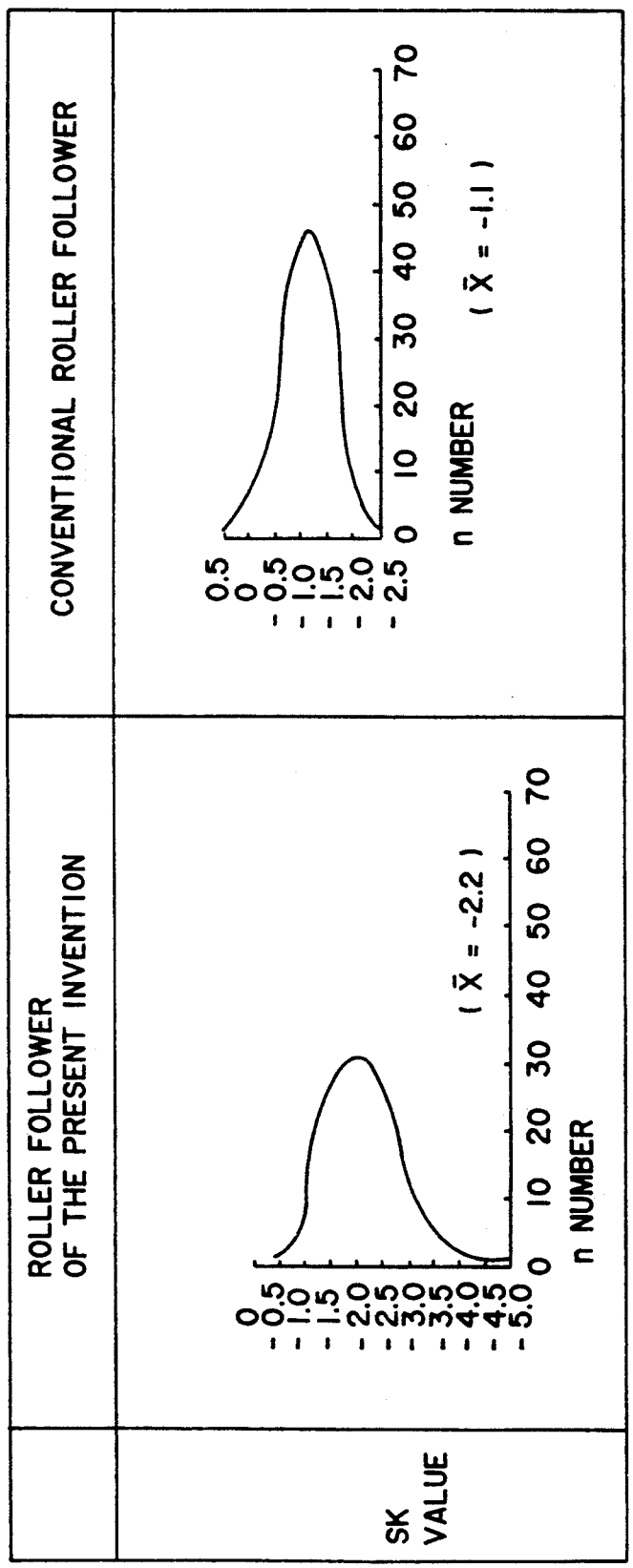

ROLLER FOLLOWER FOR ENGINE

BACKGROUND OF THE INVENTION

This invention relates to a roller follower with a roller adapted for rolling contact with a cam on a camshaft of an engine, and more specifically to a roller follower which exhibits a long life irrespective of the lubricating conditions with respect to the cam surface of the camshaft, and the hardness and surface roughness of the cam surface.

In improving the durability of the engine valve system and keeping them maintenance-free, lubrication and wear of a cam and a roller follower present problems.

To prevent wear of the valve system, a hydraulic lash adjuster is usually used in an OHV type engine. Also, in order to reduce wear and friction loss on the cam surface and the roller follower surface, there is a growing tendency to adopt a rollable roller follower.

Among the engine parts, the lubrication requirement is especially strict for such cam members. Their contact surface is called a boundary lubrication region. With a roller follower used under such conditions, its roller basically makes rolling contact with respect to the cam. However, since the rotating speed of its roller changes due to the shape of the cam or the load acting on the roller fluctuates sharply, it cannot make a pure rolling motion but makes rolling contact accompanying sliding motion. This may cause peeling on the outer peripheral rolling surface of the roller, though depending upon the lubricating conditions (amount of oil, oil temperature, and foreign matter) and the surface roughness of the mating cam, thus shortening its life.

It is well-known that the rolling life of the roller is greatly influenced by the surface roughness of its outer peripheral rolling surface. Heretofore, it has been thought that the more smoothly the outer peripheral rolling surface is finished, the longer the life. But, the finished surface of the cam surface usually has an Rmax (parameter of surface roughness) of 2-4 microns when finished by grinding. This is not satisfactory as a rolling contact surface. At the contact portion between the cam surface and the roller, which is a rather strict boundary lubrication region, metal-to-metal contact partially occurs, making the parts liable to surface breakage. Thus, it is desired to increase the durability of the roller by preventing it from getting damaged.

SUMMARY OF THE INVENTION

An object of the present invention is to provide a long-life roller follower for use with an engine which exhibits an excellent oil film formation while in rolling contact irrespective of whether or not the mating cam surface has a good roughness.

In accordance with the present invention, there is provided a roller follower for use with an engine, the roller follower having a roller adapted to be in rolling contact with a cam on a camshaft. The roller is formed with a multiplicity of minute recesses arranged at random so that the SK value, which is a parameter representing the surface roughness, will be less than zero and so that the ratio of the total area of the minute recesses to the entire area will be 10 to 40%.

This will improve the oil film formation ratio on the outer peripheral rolling surface and make it possible to form an oil film thick enough to prevent metal-to-metal contact at the rolling contact surface and to prevent peeling and wear on the outer peripheral rolling surface of the outer ring irrespective of the roughness of the mating cam surface. Thus, the working life of the roller follower is increased.

The minute recesses serve as oil sumps to feed oil to the rolling contact surface. Even if they are compressed, oil scarcely leaks in neither the rolling direction nor the direction perpendicular thereto. Thus, the oil film is formed satisfactorily irrespective of the roughness of the mating cam surface, metal-to-metal contact is minimum, and the surface damage reduces. As a result, the durability of the engine valve system will increase. Also since the rolling frictional resistance is small, the engine efficiency improves.

BRIEF DESCRIPTION OF THE DRAWINGS

The above as well as other features and objects of the present invention will become apparent from the following description taken with reference to the accompanying drawings in which:

FIGS. 5A and 5B are a series of graphs showing the distribution of the RMS and SK values for a conventional roller follower and the roller follower according to this invention;

DETAILED DESCRIPTION OF THE PREFERRED EMBODIMENT

FIGS. 1-5 show how a roller follower is used in an engine.

Figure 1:
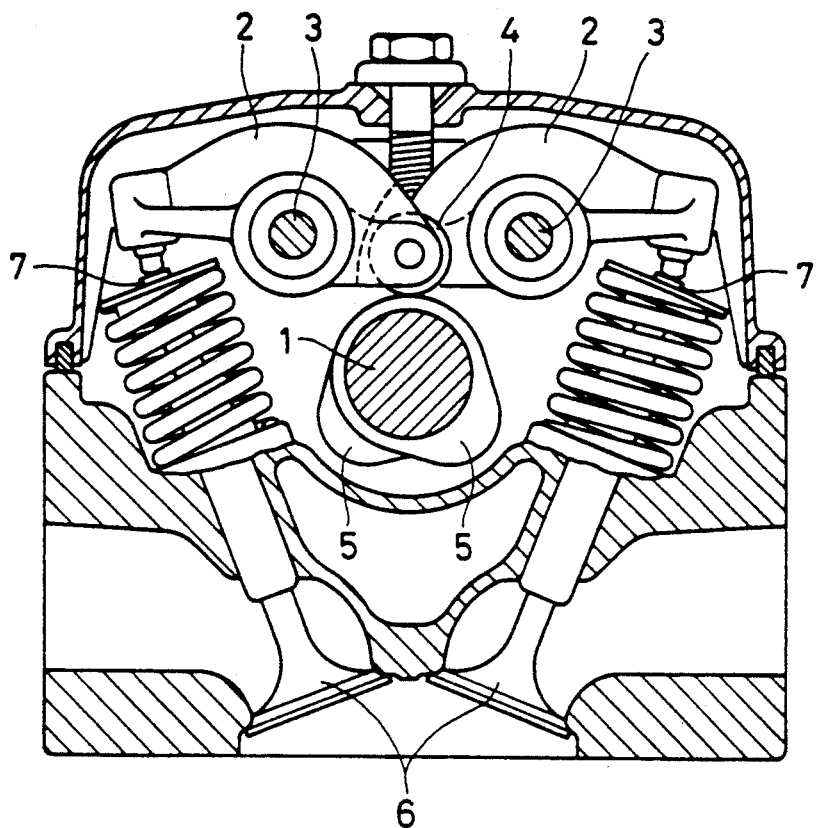
FIG. 1 is a vertical sectional view of the first example in which the roller follower according to this invention is used.
Figure 2:
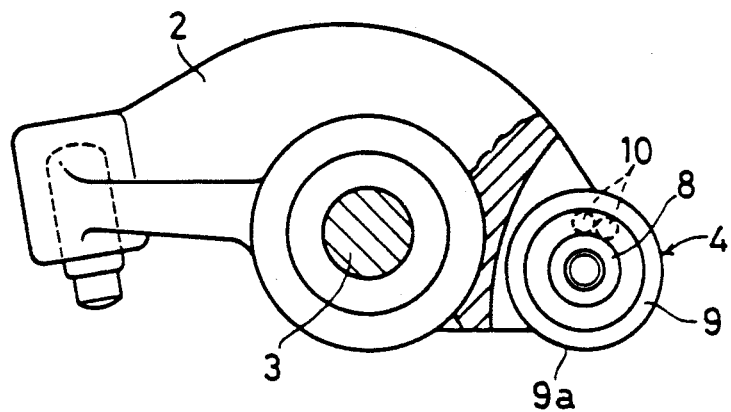
FIG. 2 is a partially cut-away sectional view of the rocker arm.

FIGS. 1 and 2 show a roller follower of a rocker arm type used in an OHC type engine.

Rocker arms 2 provided over a camshaft 1 are pivotally supported on shafts 3 at their intermediate portions. A roller follower 4 rollably mounted on the inner end of the rocker arms 2 is in rolling contact with a cam 5 on the camshaft 1. The rocker arms 2 have their other ends in abutment with stems 7 of valves 6 so that the valves can be opened and closed as the cam 5 rotates and the rocker arms 2 rock.

Figure 3:
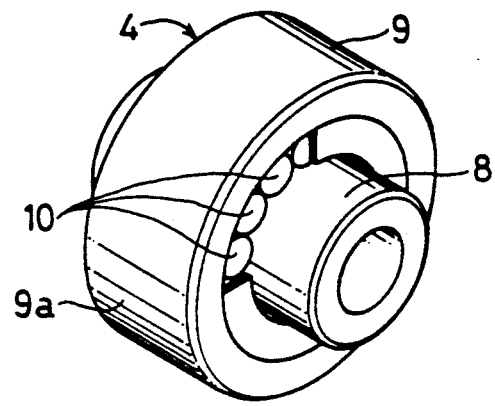
FIG. 3 is a perspective view of the roller follower used for the same.

In FIG. 3, the roller follower 4 is of a rolling type having a roller 9 fitted on a support shaft 8 as the inner ring through needle rollers 10. But it may be of a slide type in which the roller 9 is directly fitted on the support shaft 8.

Also, though not shown, the outer peripheral rolling surface of the roller 9 may be flat, cut-crowned or full-crowned.

Figure 4A:
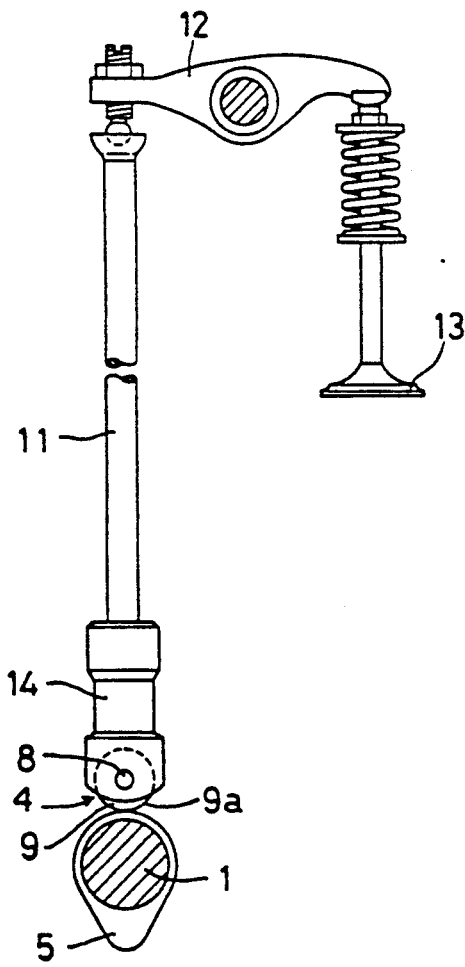
FIG. 4A is a sectional view of the second example in which the roller follower is used.
Figure 4B:
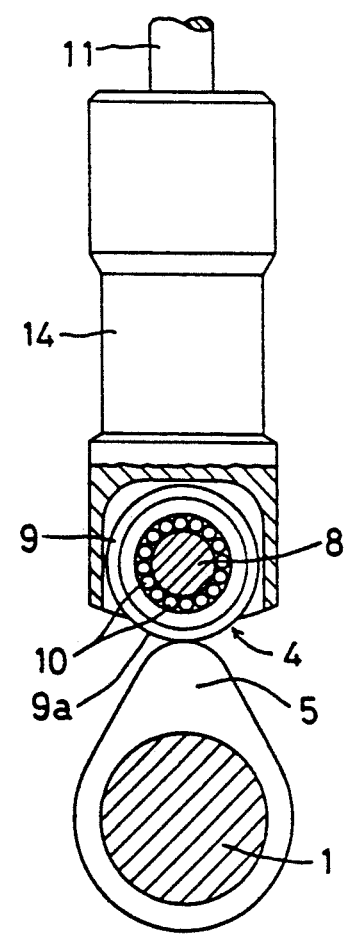
FIG. 4B is an enlarged sectional view of a part of the same.

FIGS. 4A and 4B show the roller follower used in an OHV type engine. In this arrangement, a push rod 11 is adapted to be moved up and down by a cam 5 on a camshaft 1 and has its top end coupled to one end of a rocker arm 12 to pivot it to open and close a valve 13 coupled to the other end of the rocker arm 12. A roller follower 4 is mounted on the bottom end of a hydraulic lash adjuster 14 provided at the bottom of the push rod 11 for rolling contact with the peripheral surface of the cam 5. This roller follower 4 is of a rolling type in which the roller 9 is fitted on the support shaft 8 through needle rollers 10.

The outer peripheral rolling surface of the roller 9 of the roller follower 4 is formed with minute recesses 9a arranged at random. If the surface roughness is expressed in terms of a parameter RMS, the minute recesses should be arranged so that the ratio RMS(L)/RMS(C) will be not more than 1.0 on the average wherein RMS(L) and RMS(C) represent the surface roughness of the outer peripheral surface in the axial and circumferential directions, respectively. The SK value, which is another parameter of surface roughness, should be less than zero and preferably not more than −1.5 both in the axial and circumferential directions.

The average area of the minute recesses formed in the rough surface A should be 50–250 square microns except for recesses not more than 3 microns in equivalent circle diameter. (An equivalent circle diameter refers to a value of a hypothetical diameter d associated with the an area of a hypothetical circular recess having the same area as an actual non-circular recess. The term is used to comparatively describe the area of the non-circular recesses on the roller.) The ratio of the total area of the recesses to the entire surface is 10–40% with the maximum area of the recesses being 15,000 square microns.

The outer peripheral surface having such a roughness as defined above can be formed by barreling.

The SK values represent the skewness of the curve showing the distribution of the surface roughness. If the roughness distribution forms a symmetrical curve as with a Gauss distribution curve, the SK value will be zero. It has been found that the shape and distribution of the minute recesses will be the best for the formation of oil film if the SK values in the axial and circumferential directions are not more than −1.5.

By finishing the outer peripheral surface as defined above, even if the mating cam surface is poorly finished, a sufficiently thick oil film can be formed stably, thus minimizing metal-to-metal contact at the rolling contact surface.

With the reduction in metal-to-metal contact, the outer peripheral surface of the roller can be protected against damage, peeling and abnormal wear and flaking. Thus the durability will improve.

The roller according to this invention and an ordinarily ground and super-finished roller were actually mounted on an engine to test them for oil film forming ability. The test results revealed that the outer peripheral surface of the roller according to this invention has an excellent oil forming ability.

As to the relation between the condition of the surface and the oil film formation at the rolling contact portion, grinding which leaves axial ground marks is preferable to ordinary cylindrical grinding.

It is believed that the minute grooves formed by the axial grinding serve as oil dams and supply oil to the contact portion.

Figure 5B:
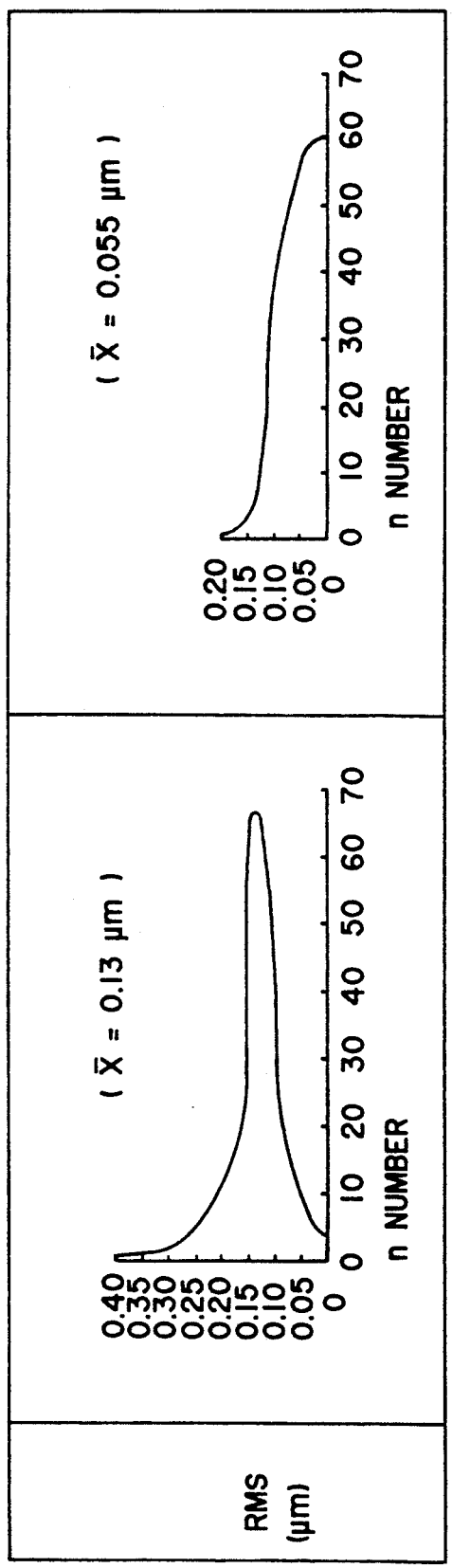
Figure 6:
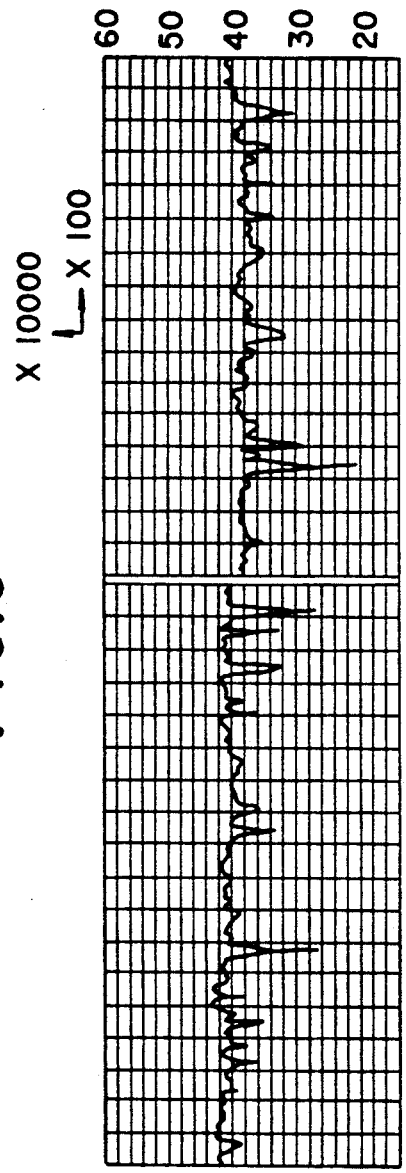
FIG. 6 is a graph showing the surface finished condition of the roller of the roller follower according to this invention.

FIGS. 5A and 5B show the distribution of the RMS and SK values on the outer rolling surface of a prior art roller follower and that of the roller follower according to the present invention. FIG. 6 shows the roughness of finished surface of the outer rolling surface of the roller of the roller follower according to this invention. It shows that there are no projections protruding from the surface.

A quantitative measurement of the minute recesses is possible by enlarging and analyzing the image of the roller surface by use of a commercially available image analyzing system.

The white portions and the black portions in the image are analyzed as the flat portions and the minute recesses, respectively. For example, if an image analyzing system is used for analysis, the light and shade of the original is clarified with an exaggeration filter. Then the recesses not more than 3 microns in equivalent circle diameter, which are shown as very minute black portions, are removed with a noise eraser.

After the removal, the roller outer surface is analyzed by measuring the size and distribution and the ratio of the total area of the minute recesses left to the entire surface.

Next, the results of the life test made on a prior art roller follower and the roller follower according to the present invention will be described.

Table 1 shows the details of the outer peripheral surface of the rollers used for the test. Table 2 shows the results of the test.

Figure 7:
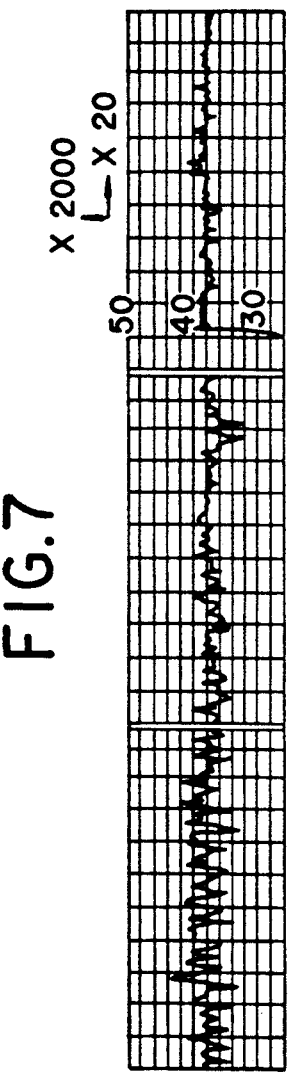
FIG. 7 is a graph showing the roughness of the mating cam surface.

Test conditions are shown below. FIG. 7 shows the roughness of the mating cam surface.

(1) Engine used for the test:
   OHC end-pivot type rocker arm
(2) Roller follower used:
   23 mm in external diameter × 9 mm wide × 10.8 mm in the inscribed circle diameter of roller
(3) Operating conditions:
   Engine speed: 6000 rpm (constant)
   Engine oil temperature: 120° C.

TABLE 1

| Roller follower | Roller surface | Area ratio of recesses to entire surface | Average area of recesses |
|---|---|---|---|
| Prior art | Ground and super-finished | not more than 10% | 20–40 $\mu m^2$ |
| Present invention | Treated as defined | 10–40% | 50–250 $\mu m^2$ |

TABLE 2

| Roller follower | Pieces tested | Cam surface roughness in Rmax | Judgement | Condition of surface of roller after 100 hours | after 300 hours |
|---|---|---|---|---|---|
| Prior art | 10 | 1–2 $\mu m$ | x | peeling | peeling |
|  | 3 | 2–3 $\mu m$ | x | damage | damage |
|  | 7 | 3–4 $\mu m$ | x | observed | observed |
| Present invention | 12 | 3–4 $\mu m$ | c | No peeling or damage observed | No peeling or damage observed |

Figure 8:
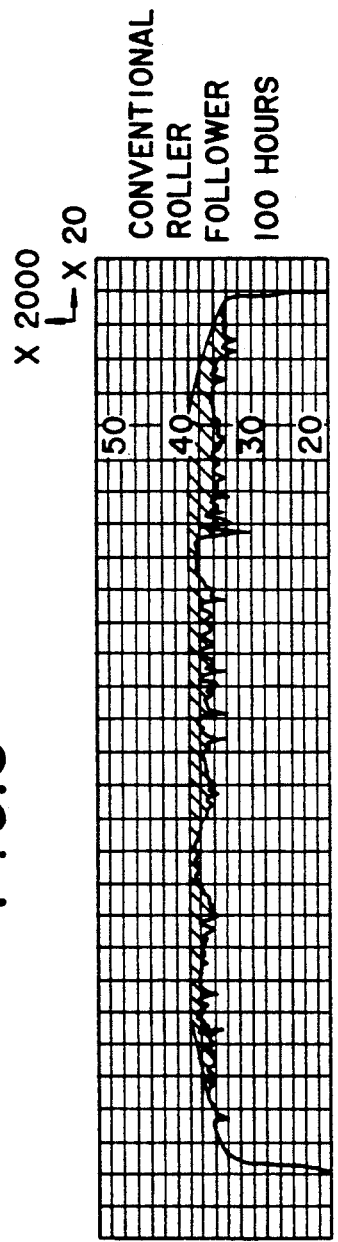
FIG. 8 is a graph showing the test results for a prior art roller follower.

As is apparent from the test results shown in Table 2, with the surface roughness of the cam surface being Rmax of 1-4 microns, the prior art roller follower developed peeling and wear considerably even in 100 hours. As shown in FIG. 8, the hatched portion shows a portion worn due to peeling.

Figure 9:
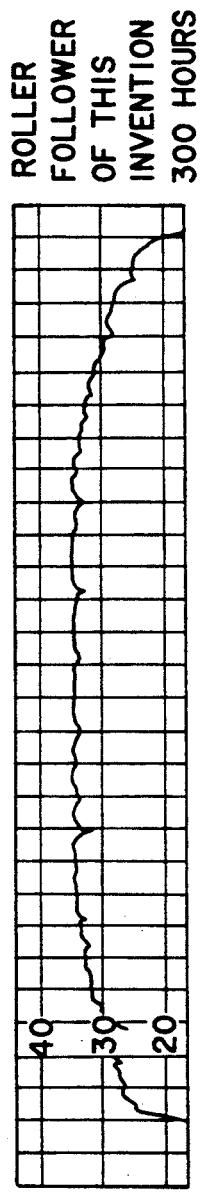
FIG. 9 is a graph showing the test results for the roller follower according to this invention.

In contrast, as shown in FIG. 9, the roller follower according to this invention showed no abnormality even after 300 hours when used with the mating cam surface having an Rmax of 3-4 microns. This shows that it has a very high durability and oil film was formed sufficiently. As for the surface roughness of the cam surface, there was no significant difference between both roller followers. In both cases, the cam surface was rounded off as a result of removal of projections.

Figure 10:
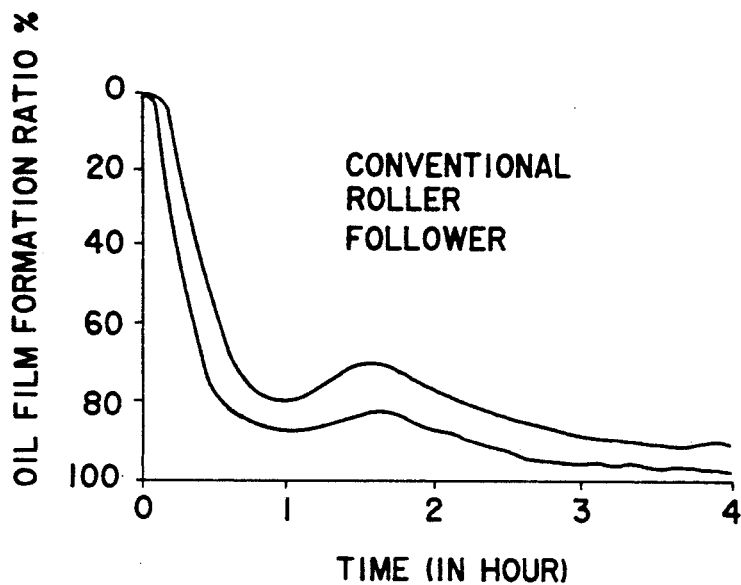
FIGS. 10 and 11 are graphs showing oil film formation ratios on a conventional roller follower and the roller follower according to the present invention, respectively.
Figure 11:
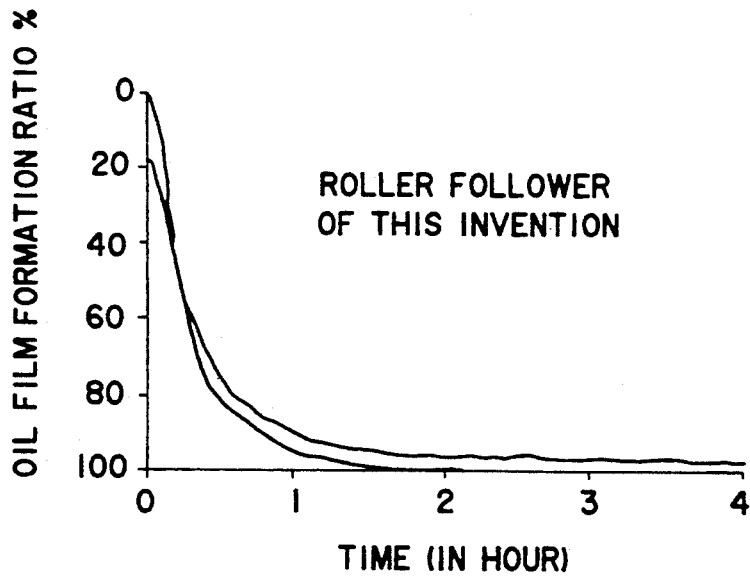

FIGS. 10 and 11 show the oil film formation ratios measured in this test. The oil film formation ratio on the finished surface of the roller follower according to the present invention was about 20% higher than that of the prior art roller follower at the beginning of operation.

Also, it was confirmed that an oil film forms substantially completely when load is applied $1.2 \times 10^5$ times.

This arrangement is effective in reducing the sliding wear coefficient between the side surfaces of the roller and the rocker arm.

What is claimed is:

1. A roller follower for use with an engine, said roller follower comprising:

a roller adapted to be in rolling contact with a cam on a camshaft, said roller being formed with a multiplicity of minute recesses arranged at random so that a SK value parameter representing the surface roughness is less than zero and so that a ratio of a total area of said minute recesses to an entire area of said roller is 10 to 40 percent, a maximum area of said minute recesses being 15,000 square microns.

2. A roller follower for use with an engine, said roller follower comprising:

a roller adapted to be in rolling contact with a cam on a camshaft, said roller being formed with a multiplicity of minute recesses arranged at random so that a SK value parameter representing the surface roughness is less than zero and so that a ratio of a total area of said minute recesses to an entire area of said roller is 10 to 40 percent, an average area of said minute recesses being 50 to 250 square microns except for recesses having an equivalent circle diameter of not more than 3 microns.

* * * * *